United States Patent
Gauthier

(12) 
(10) Patent No.: US 6,265,920 B1
(45) Date of Patent: Jul. 24, 2001

(54) POWER/AREA EFFICIENT METHOD FOR HIGH-FREQUENCY PRE-EMPHASIS FOR INTRA-CHIP SIGNALING

(75) Inventor: Claude R. Gauthier, Fremont, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/589,027

(22) Filed: Jun. 7, 2000

(51) Int. Cl.[7] ............................................. H03K 5/01
(52) U.S. Cl. ..................... 327/166; 327/165; 327/291; 327/551
(58) Field of Search ............... 327/73, 165, 166, 327/291, 551; 326/29, 30, 31, 86; 375/214, 317, 287

(56) References Cited

U.S. PATENT DOCUMENTS

| | | | |
|---|---|---|---|
| 4,637,036 | * 1/1987 | Kobari | 375/76 |
| 4,791,590 | 12/1988 | Ku et al. | 364/726 |
| 5,300,820 | * 4/1994 | Sayama et al. | 307/234 |
| 5,396,109 | * 3/1995 | Oshiba | 327/233 |
| 5,578,943 | 11/1996 | Sasaki | 326/86 |
| 5,578,944 | 11/1996 | Sasaki | 326/86 |
| 5,787,261 | 7/1998 | Osaka et al. | 395/283 |
| 5,923,201 | * 7/1999 | Suzuki | 327/291 |

OTHER PUBLICATIONS

W. Dally and J. Poulton, "Transmitter Equalization for 4Gb/s Signalling", undated, 10 pages.
J. Poulton, W. Dally and S. Tell, "A Tracking Clock Recovery Receiver for 4Gb/s Signaling", undated, 13 pages.
W. Dally, J. Poulton and S. Tell, slides from presentation: "Multi–gigabit signaling with CMOS", May 12, 1997, 26 pages.

* cited by examiner

*Primary Examiner*—Son Mai
(74) *Attorney, Agent, or Firm*—Rosenthal & Osha L.L.P.

(57) ABSTRACT

A method and circuit which allow for pre-emphasis of a high frequency on-chip signal have been developed. The circuit is configured to receive a digital signal from an on-chip source as input for a predriver stage. The method and circuit may use a dual or single predriver stage to equalize the signal when a transition in the value of the digital signal is detected. The single predriver stage circuit equalizes the signal with decreased power and area requirements for greater efficiency.

31 Claims, 5 Drawing Sheets

POWER/AREA EFFICIENT METHOD FOR HIGH-FREQUENCY PRE-EMPHASIS FOR INTRA-CHIP SIGNALING

BACKGROUND

In many digital systems, the interconnection bandwidth between chips is a critical limitation on performance. Historically, inter-chip signaling has performed much more slowly than on-chip processing. As a result, much effort has been focused on increasing bandwidth of signaling between chips since it represents a significant bottleneck for system performance. However, the same problems may develop for signals internal to the chip. As technology continues to scale smaller, the problems with intra-chip signaling will become more pronounced. Without improvements to high speed digital signaling techniques, intra-chip signaling will prove to be a limit to overall system performance.

An example of an ideal digital signal 10 is shown in FIG. 1a. A midpoint 12 is shown that serves to define the change in the value of the data bit. In the lower region 10, the data bit has a value of "0". While in the upper region 14, the data bit has a value of "1". This type of digital scheme with a mid-point 12 is referred to as a single-end signal design. FIG. 1b shows a more realistic view of the waveform of the same digital signal 18. The midpoint 12 as well as the upper 14 and lower 16 regions are the same. However, the signals are subjected to some suppression of the signal's peak value called attenuation. The attenuation is particularly pronounced in the case of a single "1" in a field of "0"s. In some instances, the attenuated signal barely reaches the midpoint 12, which results in a very low probability of detection. The attenuation is primarily caused by skin-effect resistance and dielectric absorption by the transmission line. However, the skin-effect resistance is usually the dominant factor. In any case, the magnitude of the attenuation will increase with the frequency.

With a typical broadband signal, the superposition of an unattenuated low frequency signal component with attenuated high frequency signal components causes intersymbol interference that reduces the maximum frequency at which the system can operate. During this intersymbol interference, or hysteresis, the signal "remembers" its previous state. The problem is not so much the magnitude of the attenuation as it is the interference caused by the frequency dependent nature of the attenuation. The interference comes from noise sources such as receiver offset, receiver sensitivity, crosstalk, reflections of previous data bits, and coupled supply noise.

The effects of such interference are shown in FIGS. 2a and 2b. Both of these figures show a differential digital signal design. The differential signal differs from the single end signal in that it provides complementary high and low signals instead of a single signal. FIG. 2a shows an attenuated differential signal 20. The high signal component 22 and the low signal component 24 intersect to form an eye 26. The amplitude of the eye 28 is obviously dependent on the amount of attenuation of each signal. Only a few decibels (dB) of frequency dependent attenuation can be tolerated by such a signaling system before intersymbol interference overwhelms the signal. FIG. 2b shows a differential signal with deterministic jitter 30. The amount of offset 32 of jitter affects the width of the eye and may possibly eliminate the eye entirely as shown in FIG. 2b. Jitter is caused by fluctuations in the sampling clock, fluctuations in the receiving clock, and delay variations in the signal path. Each of these sources of jitter are primarily the result of power supply modulation and crosstalk induced delay variation.

One solution to the problem of intersymbol interference is equalization of the signal by pre-emphasizing the high-frequency components of the signal before transmission. This will significantly eliminate the interference. The effects of equalization are shown in FIGS. 3a and 3b. FIG. 3a shows an unequalized signal that is similar to that shown in FIG. 2a. As shown previously, the amplitude 28 of the eye 26 of the signal is reduced due to the frequency dependent attenuation. FIG. 3b shows a signal 36 where both the high signal component 22 and the low signal component 24 have been equalized. As can be clearly seen, the amplitude 40 of the eye 38 is increased while the full width of the eye 38 is maintained.

BRIEF SUMMARY OF INVENTION

In one embodiment, the invention is a method for pre-emphasizing an intra-chip digital signal comprising: inputting a data bit from an on-chip source, a complement of the data bit, a previous data bit from an on-chip source, and a complement of the previous data bit to a predriver; pre-emphasizing a transition in value between the data bit and the previous data bit with the predriver; and outputting an equalized digital signal from the predriver to an on-chip destination.

In another embodiment, the invention is a circuit for pre-emphasizing an intra-chip digital signal comprising: a predriver which receives a data bit from an on-chip source, a complement of the data bit, a previous data bit from an on-chip source, and a complement of the previous data bit, wherein the predriver pre-emphasizes a transition in value between the data bit and the previous data bit; and an output stage which outputs an equalized digital signal to an on-chip destination.

In another embodiment, the invention is a circuit for pre-emphasizing an intra-chip digital signal comprising: means for receiving a data bit from an on-chip source, a complement of the data bit, a previous data bit from an on-chip source, and a complement of the previous data bit; and means for pre-emphasizing a transition in value between the data bit and the previous data bit, and outputting an equalized digital signal to an on-chip destination.

In another embodiment, the invention is a single sheet of silicon comprising: a predriver which receives a data bit from an on-chip source, and a previous data bit from an on-chip source, wherein the predriver pre-emphasizes a transition in value between the data bit and the previous data bit; and an output stage which outputs an equalized digital signal to an on-chip destination.

The advantages of the disclosed invention may include the use of a circuit for pre-emphasizing a high frequency intra-chip signal. The circuit may include a single or dual predriver stage. A single predriver stage allows for a reduction of power dissipation, a reduction in required area on the chip, and an increase in the bandwidth.

BRIEF DESCRIPTION OF DRAWINGS

FIG. 4b shows a diagram of the predriver of the dual predriver pre-emphasis circuit in FIG. 4a.

DETAILED DESCRIPTION

Figure 1A:
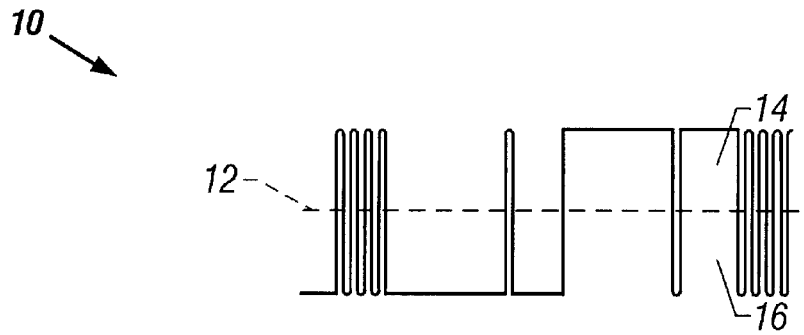
FIG. 1a shows an ideal digital signal.
Figure 1B:
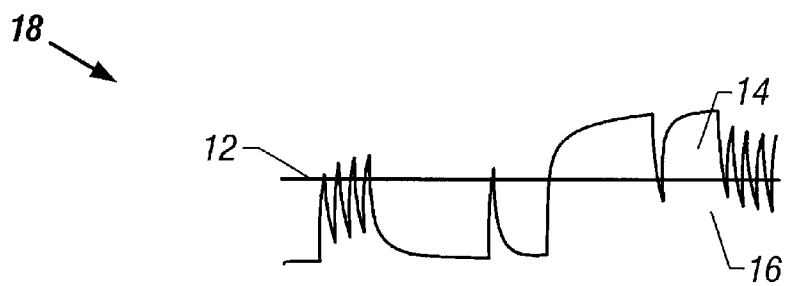
FIG. 1b shows a single-ended digital signal.
Figure 2A:
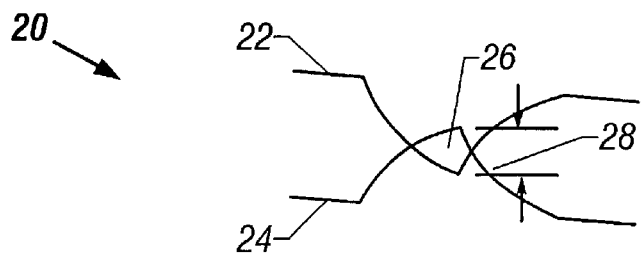
FIG. 2a shows a non-equalized differential digital signal.
Figure 2B:
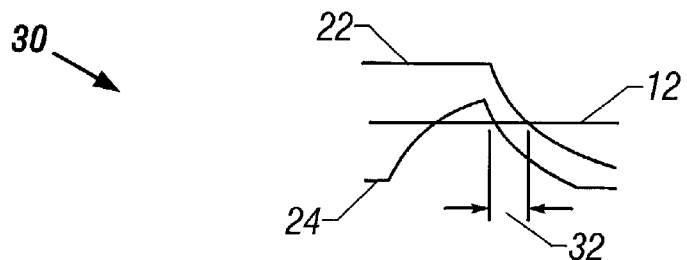
FIG. 2b shows a differential digital signal with a deterministic jitter.
Figure 3A:
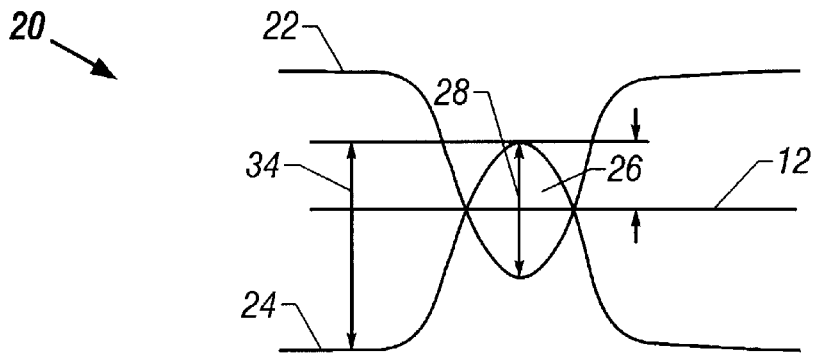
FIG. 3a shows an alternative view of a non-equalized differential digital signal.
Figure 3B:
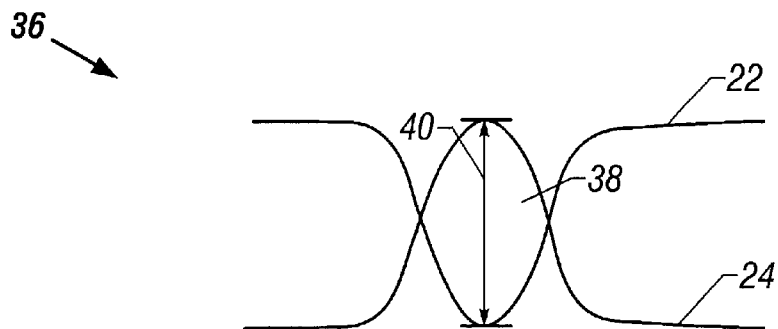
FIG. 3b shows a view of an equalized differential digital signal.

Exemplary embodiments of the invention will be described with reference to the accompanying drawings. Like items in the drawings are shown with the same reference numbers.

Figure 4A:
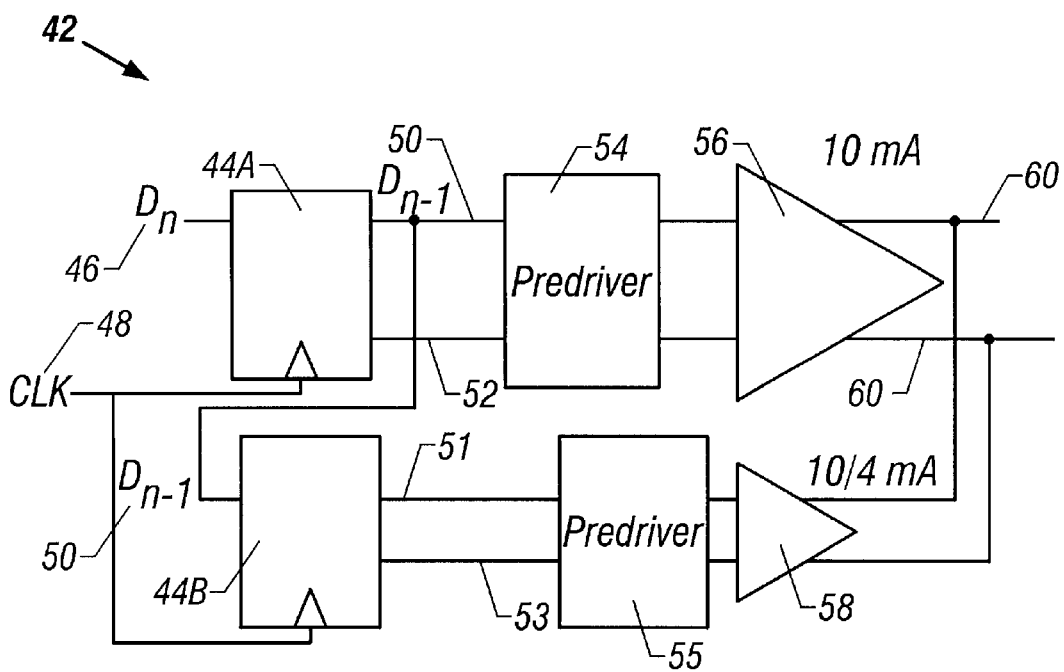
FIG. 4a shows, in accordance with one embodiment of the invention, an implementation of a dual predriver pre-emphasis circuit.

Equalization is performed by having a main transmitter and an equalizing duplicate transmitter sum their output currents. The equalizing duplicate transmitter operates with a data bit that is delayed by one clock cycle. An embodiment of a high frequency pre-emphasis circuit is shown in FIG. 4a. In this embodiment, the circuit exists entirely within a single microchip made of sheets of silicon. The circuit exists to improve the quality and speed of digital signals within that single chip. An initial data bit 46 ($D_N$) is provided as an input to a standard "flip-flop" circuit 44a. The flip-flop will output the initial data bit ($D_N$) and its complement data bit ($D_N'$) upon receiving a clock pulse 48 whereupon a new initial data bit will be provided to the flip-flop 44a. Both outputs 50 and 52 are then input into a predriver 54. Upon receipt of the clock pulse 48, the output data bit 50 ($D_{N-1}$) is also input into another flip-flop circuit 44b. Because this bit is effectively delayed one clock cycle from being input into the second flip flop 44b, it is the previous data bit 50 ($D_{N-1}$) from the initial data bit 46 ($D_N$). As with the first flip-flop 44a, the second flip-flop 44b will output the previous data bit 50 ($D_{N-1}$) and the complement previous data bit 52 ($D_{N-1}'$) upon receiving a clock pulse 48 into a second predriver 55. The outputs of both flip-flops 44a and 44b are input into two separate predrivers 54 and 55 which each comprise a pass gate multiplexer and a clamping buffer. The output from the predriver 54 for the first flip-flop 44a is input into a 10 mA output stage 56 while the output from the predriver 55 for the second flip-flop 44b is input into a 10/4 mA output stage 58. The outputs from both output stages 56 and 58 are then combined in the output lines 60. While this embodiment is shown with two flip-flop circuits, there are other arrangements of circuit devices capable of providing a delay sufficient to input a previous data bit with a current data bit to the predriver. These additional methods, such as latches, are well known in the art. As such, the example given here using two flip-flop circuits should not be considered as the only option available to provide the various data signals as input for the predriver.

Figure 4B:
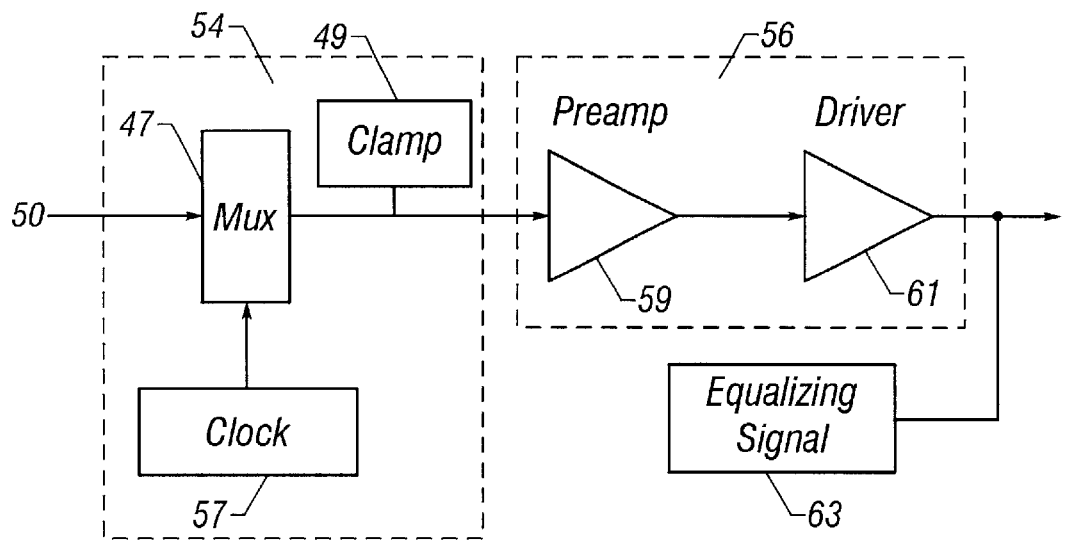

FIG. 4b shows diagram of the predriver 54 and the output stage 56 of FIG. 4a. The predriver stage 54 comprises a multiplexer 47 and a clamping buffer 49. The multiplexer 47 receives the data bit 50 and functions as a switch with the clock 57 controlling when the data passes. The predriver 54 has a specific voltage range over which it operates. The clamping buffer 49 prevents the input signal from exceeding this voltage range. Consequently, the specific characteristics of each clamp is dependent on the demands of the predriver. The output stage 56 comprises a simple pre-amplifier 59 and the driver 61. The data is output from the driver 61 and is then combined with the equalizing signal 63. While the details of only one predriver 54 and one output stage 56 are shown in FIG. 4b, it is contemplated that a similar configuration is present in the second predriver 55 and second output stage 58 of FIG. 4a. Each of the components shown in FIG. 4a and 4b are known in the prior art. However, the specific arrangement and implementation on this embodiment in an intra-chip signal application is an advantage of the present invention.

Figure 5:
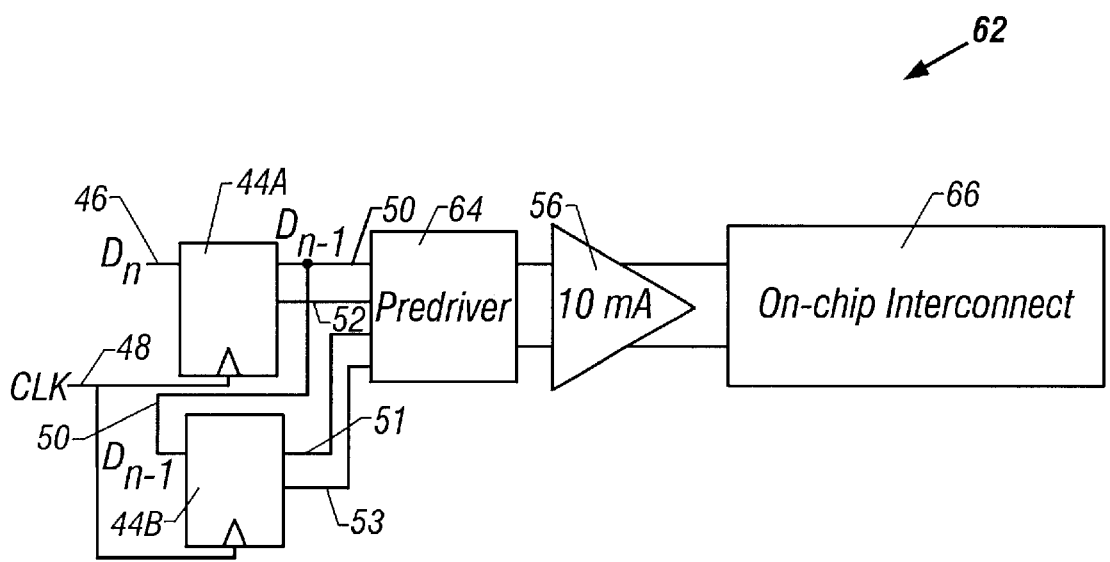
FIG. 5 shows, in accordance with one embodiment of the invention, an embodiment of an "N-channel" implementation of a pre-emphasis circuit.

FIG. 5 shows an alternative embodiment of the present invention with a high frequency pre-emphasis circuit. An initial data bit 46 ($D_N$) is provided as an input to a standard flip-flop circuit 44a. The flip-flop 44a will output the initial data bit ($D_N$) and its complement data bit ($D_N'$) upon receiving a clock pulse 48 whereupon the flip-flop 44a will receive a new data bit as input. The output data bit 50 ($D_{N-1}$) is also input into another flip-flop circuit 44b. Because this bit is effectively delayed one clock cycle from being input into the second flip flop 44b, it is the previous data bit 50 ($D_{N-1}$) from the initial data bit 46 ($D_N$). As with the first flip-flop 44a, the second flip-flop 44b will output the previous data bit 50 ($D_{N-1}$) and the complement previous data bit 52 ($D_{N-1}'$) upon receiving a clock pulse 48.

The output bits 50, 51, 52 and 53 of both flip-flops 44a and 44b are then input into a single predriver 64 which pre-emphasizes the signal and sends the result to an output stage 56. This stage could be a 10 mA output stage or any other suitable type of output stage. After the output stage 56, the signal is passed on to an off-chip interconnection 66. This connection could be a printed circuit board (PCB) trace or another suitable connection.

Figure 6:
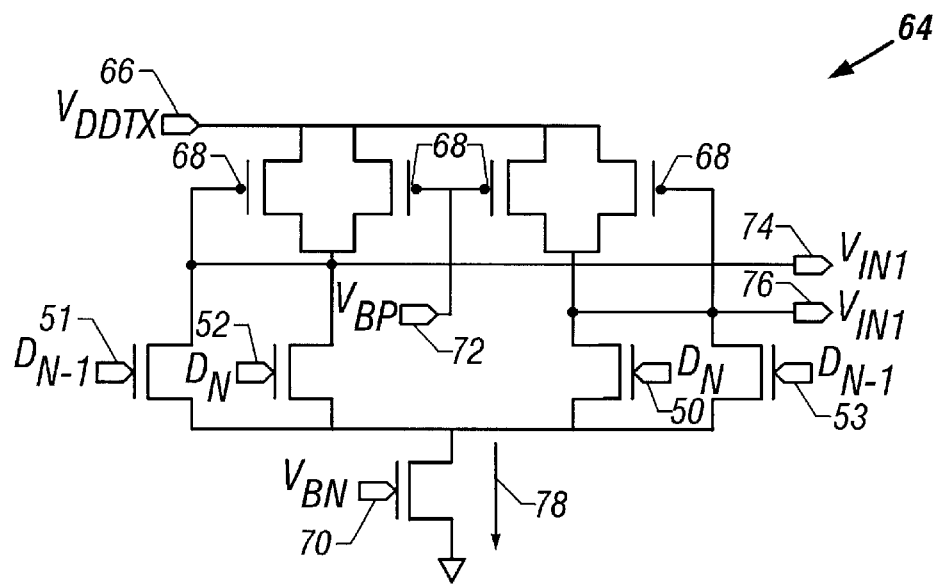
FIG. 6 shows a schematic of the predriver of the "N-channel" implementation of a pre-emphasis circuit in FIG. 5.

A detailed schematic of the predriver 64 circuitry is shown in FIG. 6. The circuit is shown with two sets of two parallel "p-type" transistors 68, a transmitter supply voltage 66 ($V_{DDTX}$), an output voltage 74 ($V_{IN1}$) with its complement voltage 76 ($V_{IN1}'$), a p-channel bias voltage 72 ($V_{BP}$) provided to two "p-type" transistors, and an n-channel bias voltage 70 ($V_{BN}$) provided to an "n-type" transistor. The inputs for all of the data bits and their complements 50, 51, 52, and 53 are shown being provided to "n-type" transistors.

The transistor which receives the n-channel bias voltage 70 ($V_{BN}$), acts as a current source for the predriver circuit 64. Increasing the size of this transistor will increase the current and correspondingly increase the speed of the stage. The input data bits 50, 51, 52, and 53 are provided to "n-type" transistors that steer the current drawn by the current source according to there differential state. The input data bits 50, 51, 52, and 53 correspond to the digital representation of the present data bit and the previous data bit. The ratio of the sizes of the transistors will determine the degree of pre-emphasis. In one embodiment, the transistors that receive the present data bit 50 and 52 are 4× larger that the transistors that receive the previous data bit 51 and 53. The resulting outputs 74 and 76 are an analog representation of the input conditions with the pre-emphasis input. The "p-type" transistors 68 function as load transistors for the circuit. Each leg contains a diode connected device and a triode connected device. The sum of these components is fairly linear and is an accurate resistor representation.

The circuit forms a digital to analog (D/A) converter. If a bit swing pattern (1-0 or 0-1) is transmitted, this predriver 64 will steer more current to the output 78 thus pre-emphasizing the transition. If a swing pattern is not transmitted, the output 78 is lessened which attenuates the amplitude.

Figure 7:
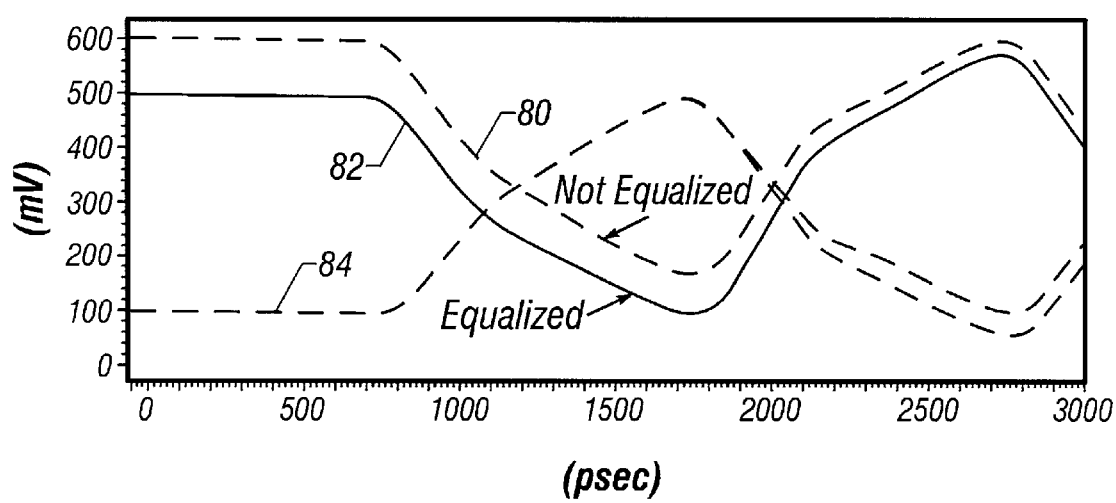
FIG. 7 shows a wave form output of the circuit shown in FIGS. 5 and 6.

FIG. 7 shows a waveform output of the circuit shown in FIGS. 5 and 6. The equalized signal 82 is shown superimposed over the non-equalized signal 80 for ease of comparison. In this embodiment, equalization has increased the eye amplitude to 390 mV from 318 mV. The width of the eye has increased to 965 psec from 815 psec.

The type of circuit shown in FIGS. 5 and 6 is known as an "n-channel" transmitter. As shown in FIG. 7, an n-channel transmitter equalizes the upper component 82 of the differential signal. An alternative embodiment uses a "p-channel" transmitter to equalize the lower component 84 of the differential signal. In this embodiment, the waveform of the lower component 84 is moved "up" in relation to the upper component 80 for a similar result as the n-channel transmitter.

Figure 8:
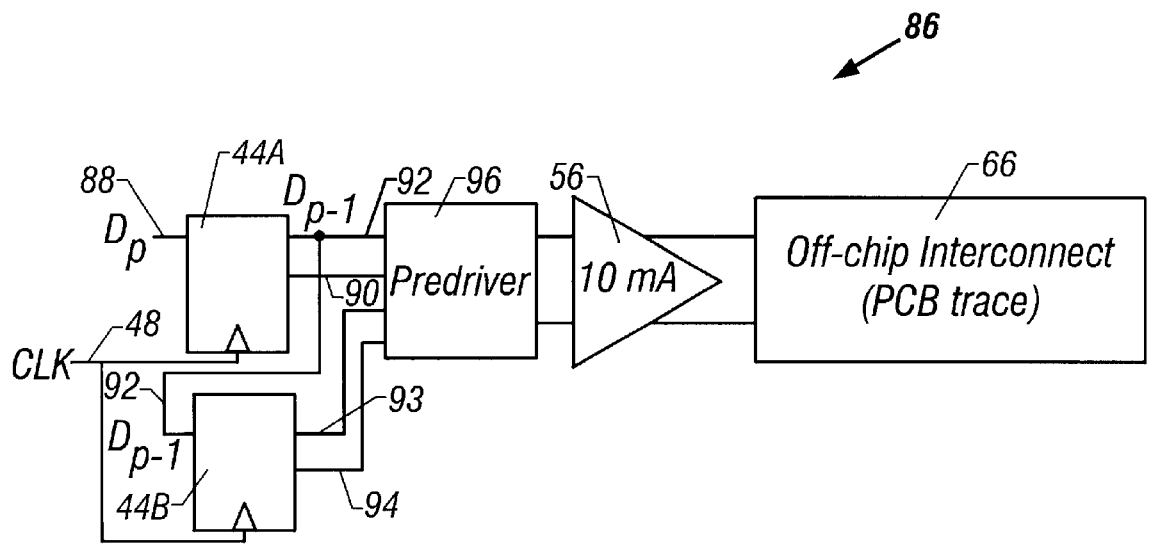
FIG. 8 shows, in accordance with one embodiment of the invention, an embodiment of a "P-channel" implementation of a pre-emphasis circuit.
Figure 9:
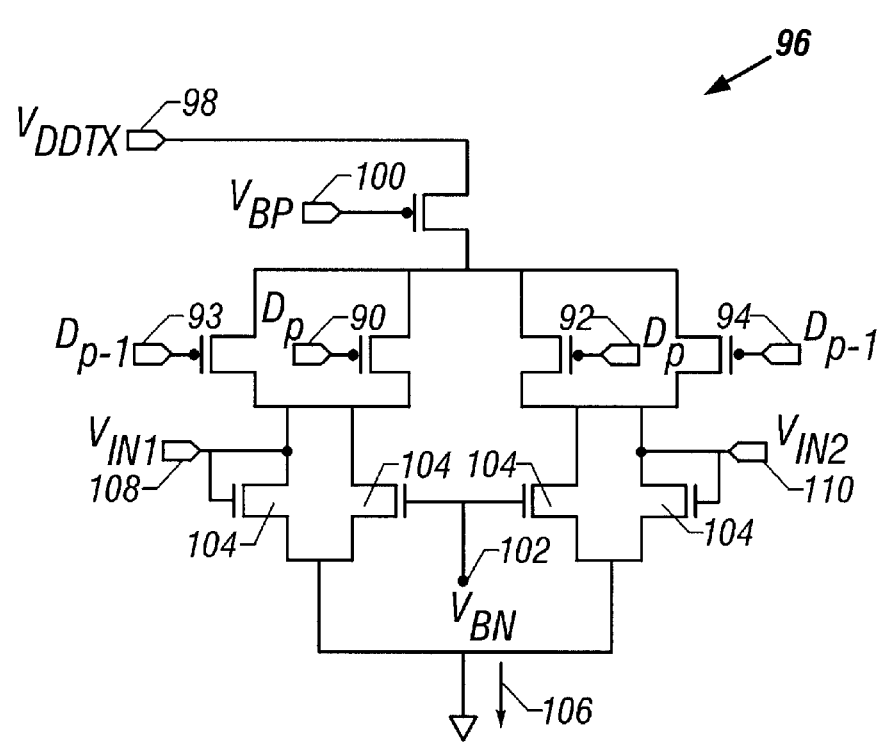
FIG. 9 shows a schematic of the predriver of the "P-channel" implementation of a pre-emphasis circuit in FIG. 8.

FIGS. 8 and 9 show an embodiment of the present invention as a p-channel transmitter. The circuit is essentially the same as the n-channel transmitter except in the schematic of the predriver 96 shown in FIG. 9. The circuit is shown with two sets of two parallel "n-type" transistors 104, a transmitter supply voltage 98 ($V_{DDTX}$), an output voltage 108 ($V_{IN1}$) with its complement voltage 110 ($V_{IN1}'$), a p-channel bias voltage 100 ($V_{BP}$) provided to a "p-type" transistor, and an n-channel bias voltage 102 ($V_{BN}$) provided to two "n-type" transistors. The inputs for all of the data bits and their complements 90, 92, 93, and 94 are shown being provided to "n-type" transistors. This circuit will function as a D/A converter in the same manner as the previously described n-channel transmitter.

When compared with each other, the n-channel transmitter offers greater bandwidth because of less capacitance being used throughout the design. Also, the n-channel transmitter requires approximately half the area for the same amount of current. However, the p-channel transmitter has an advantage in that its termination voltage is the receiver ground. This is desirable for application specific integrated circuit (ASIC) implementations with different supply voltages since the absolute voltage specification would remain constant. Additionally, electrostatic device (ESD) circuit loading is better for a p-channel transmitter because the diodes have a greater reverse bias. In summary, if timing and budget limitations of a chip design limits the maximum transfer rate and this rate can be reached by a p-channel transmitter, then the p-channel driver may be more desirable embodiment.

Alternative embodiments could also include the use of twin termination. This involves terminating the transmission line at both ends by incorporating pull-up resistors at the outputs of the transmitting side. These resistors will absorb any reflections from the receiving side. This will reduce the maximum DC signal amplitude by a factor of 2. However, it will increase the signal to noise ratio significantly and consequently reduce deterministic jitter. The net effect is that twin termination trades amplitude margin for timing margin. Twin termination is appropriate if the amplitude falls with the specification for an ASIC.

Table 1 shows the performance characteristics of several embodiments. The design constraints imposed a maximum possible bandwidth of 1.4 Gb/s. The power dissipation results were estimates reflected by a circuit simulator. The transmitter area was calculated by summing the area (width by length) that was used. A fudge factor of 4.5 was incorporated to cover any errors. Finally, the eye amplitude was measured at the end of a 30" line. The results for the present embodiments of the invention are based on data obtained from laboratory simulations.

TABLE 1

| OPTION | BAND-WIDTH (Gb/s) | POWER DISSI-PATION (mW) | TRANS-MITTER AREA ($\mu m^2$) | EYE AMPLI-TUDE (mV) |
| --- | --- | --- | --- | --- |
| N-Transmitter | 1.05 | 13.5 | 333 | 225 |
| N Transmitter + Equalization | 1.21 | 17 | 440 | 280 |
| N Transmitter + Twin Termination | 1.15 | 14.3 | 533 | 150 |
| N Transmitter + Power/Area Efficient Equalization | 1.21 | 15 | 400 | 280 |
| P-Transmitter | 1.05 | 12 | 774 | 210 |
| P Transmitter + Equalization | 1.21 | 15 | 1015 | 225 |
| P Transmitter + Twin Termination | 1.15 | 13 | 974 | 135 |
| P Transmitter + Power/Area Efficient Equalization | 1.15 | 13 | 850 | 225 |

The advantages of the disclosed invention may include the use of a circuit for pre-emphasizing a high frequency intra-chip signal. The circuit may include a single or dual predriver stage. A single predriver stage allows for a reduction of power dissipation, a reduction in required area on the chip, and an increase in the bandwidth.

While the invention has been disclosed with reference to specific examples of embodiments, numerous variations and modifications are possible. Therefore, it is intended that the invention not be limited by the description in the specification, but rather the claims that follow.

What is claimed is:

1. A method for pre-emphasizing an intra-chip digital signal comprising:
   inputting a data bit from an on-chip source, a complement of the data bit, a previous data bit from an on-chip source, and a complement of the previous data bit to a predriver;
   pre-emphasizing a transition in value between the data bit and the previous data bit with the predriver; and
   outputting an equalized digital signal from the predriver to an on-chip destination.

2. The method of claim 1 wherein the data bit, the complement of the data bit, the previous data bit, and the complement of the previous data bit are input to a plurality of predrivers.

3. The method of claim 2 wherein each of the plurality of the predrivers comprises:
   a multiplexer; and
   a clamping buffer.

4. The method of claim 1 wherein the data bit, the complement of the data bit, the previous data bit, and the complement of the previous data bit are input to a single predriver.

5. The method of claim 4 wherein the predriver is an n-channel predriver.

6. The method of claim 4 wherein the predriver is a p-channel predriver.

7. The method of claim 4, further comprising:
receiving the equalized digital signal in an output stage; and
outputting the equalized digital signal to a signal interconnection.

8. The method of claim 7 wherein the signal interconnection is a transmitter.

9. The method of claim 8 wherein at least one pull up resistor is connected to an output of the signal interconnection.

10. A method for pre-emphasizing an intra-chip digital signal comprising:
inputting a data bit from an on-chip source as input to a first flip-flop circuit;
outputting the data bit and the complement of the data bit from the first flip-flop circuit;
inputting a previous data bit from the output of the first flip-flop circuit to a second flip-flop circuit;
outputting the previous data bit and the complement of the previous data bit from the second flip-flop circuit;
inputting the data bit, the complement of the data bit, the previous data bit, and the complement of the previous data bit as input to a predriver;
pre-emphasizing a transition in value between the data bit and the previous data bit with the predriver; and
outputting an equalized digital signal from the predriver to an on-chip destination.

11. A circuit for pre-emphasizing an intra-chip digital signal comprising:
a predriver which receives a data bit from an on-chip source, a complement of the data bit, a previous data bit from an on-chip source, and a complement of the previous data bit, wherein the predriver pre-emphasizes a transition in value between the data bit and the previous data bit; and
an output stage which outputs an equalized digital signal to an on-chip destination.

12. The circuit of claim 11 wherein a plurality of predrivers receives the data bit, the complement of the data bit, the previous data bit, and the complement of the previous data bit.

13. The circuit of claim 12 wherein each of the plurality of predrivers comprises:
a multiplexer; and
a clamping buffer.

14. The circuit of claim 11 wherein a single predriver receives the data bit, the complement of the data bit, the previous data bit, and the complement of the previous data bit.

15. The circuit of claim 14 wherein the predriver is an n-channel predriver.

16. The circuit of claim 14 wherein the predriver is a p-channel predriver.

17. The circuit of claim 14 wherein the output stage outputs the equalized digital signal to a signal interconnection.

18. The circuit of claim 17 wherein the signal interconnection is a transmitter.

19. The circuit of claim 18, further comprising:
at least one pull up resistor connected to an output of the signal interconnection.

20. A circuit for pre-emphasizing an intra-chip digital signal comprising:
a first flip-flop circuit which receives a data bit from an on-chip source and outputs the data bit and the complement of the data bit;
a second flip-flop circuit which receives a previous data bit from the output of the first flip-flop circuit and outputs the previous data bit and the complement of the previous data bit; and
a predriver which receives the data bit, the complement of the data bit, the previous data bit, and the complement of the previous data bit, wherein the predriver pre-emphasizes a transition in value between the data bit and the previous data bit, and outputs an equalized digital signal to an on-chip destination.

21. A circuit for pre-emphasizing an intra-chip digital signal comprising:
means for receiving a data bit from an on-chip source, a complement of the data bit, a previous data bit from an on-chip source, and a complement of the previous data bit; and
means for pre-emphasizing a transition in value between the data bit and the previous data bit, and outputting an equalized digital signal to an on-chip destination.

22. A single sheet of silicon comprising:
a predriver which receives a data bit from an on-chip source, and a previous data bit from an on-chip source, wherein the predriver pre-emphasizes a transition in value between the data bit and the previous data bit; and
an output stage which outputs an equalized digital signal to an on-chip destination.

23. The single sheet of silicon of claim 22 wherein a plurality of predrivers receives the data bit, and the previous data bit.

24. The single sheet of silicon of claim 23 wherein each of the plurality of predrivers comprises:
a multiplexer; and
a clamping buffer.

25. The single sheet of silicon of claim 22 wherein a single predriver receives the data bit, and the previous data bit.

26. The single sheet of silicon of claim 25 wherein the predriver is an n-channel predriver.

27. The single sheet of silicon of claim 25 wherein the predriver is a p-channel predriver.

28. The single sheet of silicon of claim 25 wherein the output stage outputs the equalized digital signal to a signal interconnection.

29. The single sheet of silicon of claim 28 wherein the signal interconnection is a transmitter.

30. The single sheet of silicon of claim 29, further comprising:
at least one pull up resistor connected to an output of the signal interconnection.

31. A single sheet of silicon for pre-emphasizing an intra-chip digital signal comprising:
a first flip-flop circuit which receives a data bit from an on-chip source and outputs the data bit and the complement of the data bit;
a second flip-flop circuit which receives a previous data bit from the output of the first flip-flop circuit and outputs the previous data bit and the complement of the previous data bit; and
a predriver which receives the data bit, the complement of the data bit, the previous data bit, and the complement of the previous data bit, wherein the predriver pre-emphasizes a transition in value between the data bit and the previous data bit, and outputs an equalized digital signal to an on-chip destination.

* * * * *